No. 683,884. Patented Oct. 1, 1901.
T. F. PAYNE.
WATER SEAL TRAP.
(Application filed Aug. 30, 1900.)
(No Model.)

UNITED STATES PATENT OFFICE.

THOMAS F. PAYNE, OF SPOKANE, WASHINGTON.

WATER-SEAL TRAP.

SPECIFICATION forming part of Letters Patent No. 683,884, dated October 1, 1901.

Application filed August 30, 1900. Serial No. 28,519. (No model.)

*To all whom it may concern:*

Be it known that I, THOMAS F. PAYNE, a citizen of the United States, residing at Spokane, in the county of Spokane and State of Washington, have invented a new and useful Improvement in Water-Seal Traps, of which the following is a specification, reference being had to the accompanying drawings, and to the numerals of reference marked thereon.

My invention relates to certain new and useful improvements in traps—such as are used more especially with waste-pipes leading from washbowls, sinks, and the like—to prevent sewer and other noxious gases from passing into the atmosphere from a sewer connected thereto.

Traps such as are commonly used to seal waste-pipes by means of water are liable at times to become clogged by foreign matters entering the waste-pipes and which by adhering to the walls thereof gradually reduce the size of the bore of the outlet-pipe until it becomes too small to carry off the water. When in this condition, they cannot be readily cleaned or cleared of obstructions, their sinuous shape preventing the introduction of suitable implements. To overcome the difficulty mentioned, I have designed the trap shown in the accompanying drawings, wherein—

Figure 1:
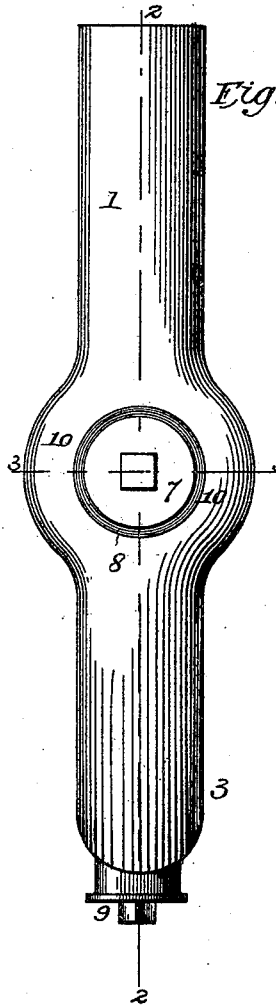
Figure 2:
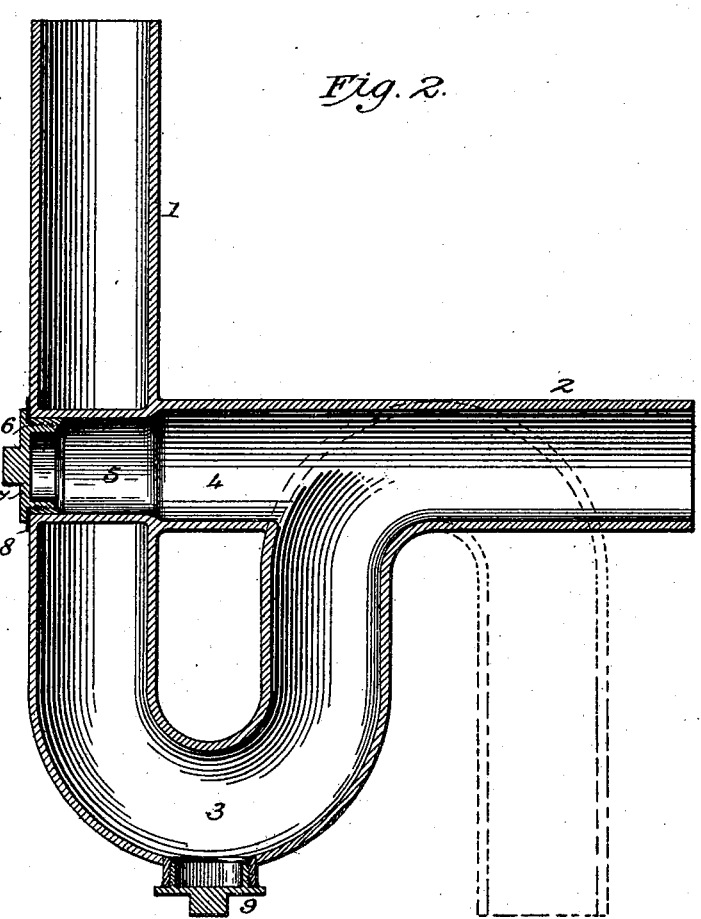
Figure 3:
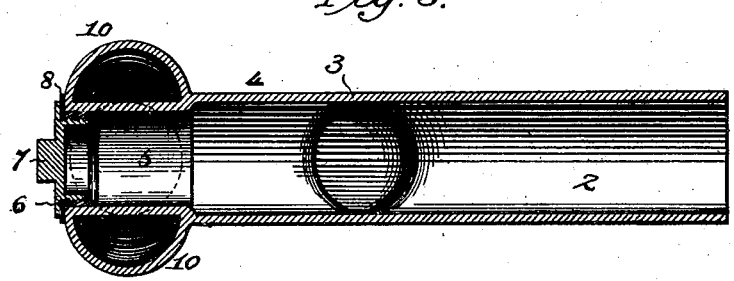

Figure 1 is an elevation of my improved trap. Fig. 2 is a vertical section on the line 2 2 of Fig. 1. Fig. 3 is a horizontal section on the line 3 3 of the same figure.

Similar numerals indicate similar parts in the several views.

1 indicates the inlet end or pipe of a trap constructed in accordance with my invention. 2 represents the outlet, and 3 the connecting or water-seal portion between the two ends, it being curved downwardly in the usual manner. A pipe 4 extends in a substantially horizontal direction from the point of connection between the parts 2 and 3 to and through the inlet-pipe 1. The pipe 4 is practically the same diameter as the other parts of the trap except where it passes through the inlet-pipe, the diameter there being reduced, as at 5. The inlet-pipe 1 is enlarged at that part 10 through which the pipe 4 passes, this being necessary to afford sufficient space for the passage of water around the said pipe. The outer end of the part 5 is provided with a screw-plug 7, a similar one 9 being also placed at the lower part of the connecting-piece 3. The plug may fit in a threaded thimble 6 and be rendered tight by means of a washer 8. As thus constructed the trap can be cleaned with ease and rapidity. On removing the screw-plug 7 a straight passage-way is secured to the outlet-pipe, which latter may be horizontal or it may curve downwardly, as shown by the dotted lines in Fig. 2. A flexible rod of metal, wood, ratan, or other substance may be readily introduced through the pipe 4 and the obstruction broken down and withdrawn.

I have hereinabove described my invention as applicable to washbasins and other places where a trap of small size is needed. It is, however, adapted to traps of larger size—such, for instance, as water-closet traps, drain-traps, &c. The trap is preferably made of one piece, either cast or molded of earthenware, although it may be made of more than one piece and soldered when made of lead. The parts 4 and 5 may and preferably will be of relatively smaller dimensions in large traps, the passage through said parts requiring to be of such size as to admit of the introduction of the necessary cleaning implements.

Having thus described my invention, I claim—

1. A trap with a water seal having a passage open to the air extending from the highest part of the waste-pipe and in line therewith and with the water seal to and through the inlet-pipe, substantially as set forth.

2. A trap with a water seal having a passage open to the air extending from the highest part of the waste-pipe and in line therewith and with the water seal to and through the inlet-pipe, and a plug to close the outer end of the passage, substantially as set forth.

3. In a trap, the combination of an inlet-pipe, an outlet-pipe, and a water seal connecting the two pipes, there being a passage from the junction of the waste-pipe and water seal and in line therewith to and through the inlet-pipe, substantially as set forth.

4. In a trap, the combination of an inlet-pipe having an enlarged portion, an outlet-pipe, and a water seal between the two pipes, a straight passage extending from the junction of the outlet-pipe and water seal and in line therewith to and through the enlarged portion of the inlet-pipe, substantially as set forth.

5. In a trap, the combination of an inlet-pipe having an enlarged portion, an outlet-pipe, a water seal between the two pipes, a straight passage extending from the junction of the waste-pipe and water seal and in line therewith to and through the enlarged portion of the inlet-pipe, that part of the passage passing through the inlet-pipe being of less diameter than the remaining part, and a plug to close the passage, substantially as set forth.

6. In a trap, the combination of an inlet-pipe having an enlarged portion, an outlet-pipe, a U-shaped water seal between the two pipes, a straight passage extending from the junction of the waste-pipe and water seal to and through the enlarged portion of the inlet-pipe, and a plug to close the passage, substantially as set forth.

7. In a trap, the combination of an inlet-pipe having an enlarged portion, an outlet-pipe, a U-shaped water seal between the two pipes, a straight passage extending from the junction of the waste-pipe and water seal to and through the enlarged portion of the inlet-pipe, that part of the passage passing through the inlet-pipe being of less diameter than the remaining part, and a plug to close the passage, substantially as set forth.

In testimony whereof I hereunto set my hand and seal.

THOMAS F. PAYNE. [L. S.]

Witnesses:
M. J. MALONEY,
F. C. ROBERTSON.